(12) United States Patent
Sanskrit

(10) Patent No.: US 6,634,659 B2
(45) Date of Patent: Oct. 21, 2003

(54) MULTI-PURPOSE TRANSPORTER

(76) Inventor: Sunildut Sanskrit, 280 Marin Blvd. Apt. #22H, Jersey City, NJ (US) 07302

( * ) Notice: Subject to any disclaimer, the term of this patent is extended or adjusted under 35 U.S.C. 154(b) by 39 days.

(21) Appl. No.: 10/056,816

(22) Filed: Jan. 24, 2002

(65) Prior Publication Data

US 2003/0137118 A1 Jul. 24, 2003

(51) Int. Cl.⁷ ............................. B65D 77/00; B62B 1/00
(52) U.S. Cl. .......................... 280/47.26; 280/47.33; 280/79.5; 206/217
(58) Field of Search ................... 280/47.26, 47.33, 280/79.5, 654, 659; 220/1.5, 523; 206/217 D34/24, 25

(56) References Cited

U.S. PATENT DOCUMENTS

| | | | |
|---|---|---|---|
| 3,395,550 A | * 8/1968 | Dungan | 62/400 |
| 4,089,446 A | * 5/1978 | Logan et al. | 222/609 |
| 4,162,029 A | * 7/1979 | Gottsegen et al. | 222/131 |
| 4,688,643 A | * 8/1987 | Carter et al. | 169/33 |
| 4,778,191 A | 10/1988 | Heisson | 280/47.26 |
| 4,846,493 A | * 7/1989 | Mason | 280/641 |
| 4,873,841 A | * 10/1989 | Bradshaw et al. | 62/239 |
| 5,139,278 A | 8/1992 | Vlasicak | 280/47.26 |
| 5,169,164 A | * 12/1992 | Bradford | 280/35 |
| 5,222,631 A | * 6/1993 | Hood | 222/131 |
| 5,294,137 A | 3/1994 | Barber et al. | 280/47.26 |
| 5,313,817 A | * 5/1994 | Meinders | 62/457.1 |
| 5,346,245 A | 9/1994 | Budrow et al. | 280/655 |
| 5,370,409 A | 12/1994 | Latouche | 280/47.26 |
| 5,467,884 A | * 11/1995 | Schutz | 220/1.5 |
| 5,480,191 A | 1/1996 | Litin et al. | 280/831 |
| D379,704 S | * 6/1997 | Corlett et al. | D34/24 |
| 6,032,963 A | * 3/2000 | Daugherty | 280/47.26 |
| 6,047,866 A | 4/2000 | Brown | 222/608 |
| 6,129,117 A | * 10/2000 | Eriksson | 137/899 |
| 6,364,329 B1 | * 4/2002 | Holub et al. | 280/47.26 |

* cited by examiner

Primary Examiner—Brian L. Johnson
Assistant Examiner—Brian L Swenson
(74) Attorney, Agent, or Firm—Brown & Michaels, PC

(57) ABSTRACT

A multi-purpose transporter having a hollow container with at least one opening located at least on the upper surface, a pair of frame rails on either side of the hollow container with hand grips on one end and wheels on the other, a frame with support straps extending underneath the hollow container between the pair of handles; and at least one opening on the rear of the container. The transporter is normally supported by the wheels and legs attached to the frame rails. When the transporter is tipped forward, the opening is supported above the ground by a forward support element, which can include a compartment with a lid.

10 Claims, 3 Drawing Sheets

MULTI-PURPOSE TRANSPORTER

BACKGROUND OF THE INVENTION

1. Field of the Invention

The invention pertains to the field of land vehicles. More particularly, the invention pertains to handle supported tiltable hand vehicles for the transportation of liquids and granular products.

2. Description of Related Art

People around the world, especially in rural communities, and those struck by natural disasters, are often required to transport water for domestic uses from a well or other water source to their home. The transportation of large quantities of water can be tiresome over rough, rugged terrain, and the water often needs to be filtered or treated in another way before the water may be used for everyday needs. Transportation of large quantities of water is difficult due to the nature of liquids and the weight of liquids.

Various types of transportation devices have been developed in the past for transporting water, fuel, waste and other liquids, but they all are problematic for people who need to transport liquids or granular products in a rural environment with a rugged terrain. Problems that people in rural communities face include: having to transport the water over a great distance; limited storage area for both the transport device and the hollow container itself, stability of the transport device, in that the liquid, such as water, is a limited resource that can not afford to be spilled or lost; and treating the water or liquid before it is used for human or animal consumption.

There are numerous examples of transport containers for the movement of liquids. One example is Budrow et al. 's, "Portable Tank with Extending Handle," U.S. Pat. No. 5,346,245, issued Sep. 13, 1994, which discloses a plastic tank with a handle that extends, where the handle is part of the molded plastic that makes up the tank. Mounted to the plastic tank to allow movement is a set of wheels.

Another example of an invention that transports liquids is Heisson's "Waste Transporter," U.S. Pat. No. 4,778,191, issued Oct. 18, 1988, which discloses a transport device that has a tank with an entry-exit chute at one end and wheels on the other. A handle is attached to the chute end of the tank to act as a fulcrum when the tank is put in an upright position to empty the tank of its contents. There is only one way to empty the tank, which is pushing the container so that the chute portion goes up in the air, which is awkward, and empties only a small portion of the container by gravity. The position with which the container needs to be emptied lends itself to spillage and would be difficult to position the tank in the correct position to empty it by ones self.

Vlasicak's "Versatile Fuel Container," U.S. Pat. No. 5,139,278, issued Aug. 18, 1992, discloses a 25 gallon container that has wheels and a handle. The container has only one spout, which located at a 45-degree angle relative to the front and top walls of the container. This invention can only be emptied of its liquid contents by lifting the container since the only spout is located at the 45 degree angle relative to the front and top wall of the container.

Another example of a transport device for liquids is Latouche's "Towable Mobile Fluid Carrier," U.S. Pat. No. 5,370,409, issued Dec. 6, 1994, which discloses a container with a recessed region in the lower middle portion, a carriage assembly, and a vent mouth and cap located in the top of the container. The carriage assembly consists of wheels and a handle, with the wheels fitting into the recessed portion of the container. This invention can only be emptied by picking the container up and turning it on its side, since the vent mouth and cap are located at the top of the container body, which is unstable.

Brown's "Portable Liquid Dispenser," U.S. Pat. No. 6,047,866, issued Apr. 11, 2000, discloses an insulated, removable container, on a wheeled container cart that is mounted on the cart in a raised position only, so as to allow water to dispense through multiple tubes by gravity.

Another example of a transport device for liquids is Litin et al.'s "Spill Containing Storage and Transportation Device," U.S. Pat. No. 5,480,191, issued Jan. 2, 1996, which discloses storage and transportation of metal drums, using a cart that contains a recess for collecting spills or overflow, wheels, and hand-holds.

Barber et al.'s "Transport Container with Integral Dolly," U.S. Pat. No. 5,294,137, issued Mar. 15, 1994, discloses a removable container that fits into a metal frame that has 4 wheels and one handle. The container is supported in the metal frame by straps. The container has two openings, one on the bottom and one on the top of the container. The placement of the top opening is such that when the container is in the metal frame, the container cannot be emptied fully, since the opening is above a recessed portion of the container. Furthermore, with the small sets of wheels, the transport would not be applicable to a rough, rugged terrain.

All of the above transportation devices for liquids do not allow a storage place for a mesh strainer or a mesh strainer device to strain the incoming liquid.

SUMMARY OF THE INVENTION

The invention presents a multi-purpose transporter comprising: a hollow container having at least one opening located at least on the upper surface of said container; a metal frame surrounding said container and said metal frame is attached to a pair of legs; a pair of handles on either side of said container, having a first end containing hand grips and a second end connected to a pair of wheels; at least one support strap that extends from one of the said pair of handles, underneath said container to the other of the said pair of handles; and a container opening on a surface such that when said legs are above said pair of wheels, said opening is above a forward support element.

The present invention solves the problem of the rugged terrain by using wheels of a large circumference. The stability of the container is ensured by the use of two handles to push, pull, or use to tilt the container. The container has two openings that can be used to drain the container, both at the top and the bottom side of the container. The opening on the top of the container is placed in such a way that the container can nearly be completely emptied when the legs are placed above the wheels, and the container is resting on the forward support element.

DETAILED DESCRIPTION OF THE INVENTION

The present invention is a portable transporter of both liquids and granular products, which is especially useful in rural communities located in a rugged terrain or with unpaved roads.

Figure 1:
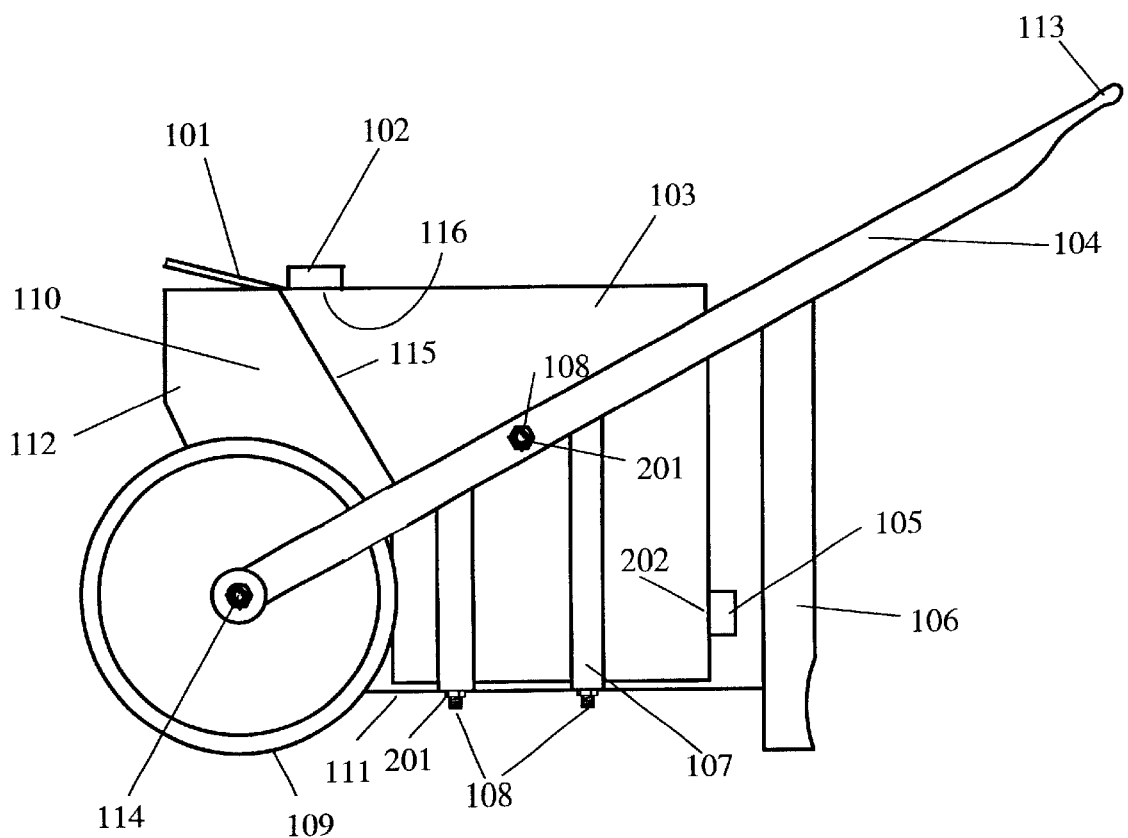
FIG. 1 shows a side view of the present invention.

The multi-purpose transporter of the present invention is shown in the Figures and is designated as 100. A side view of a preferred embodiment the multi-purpose transporter (100) is shown in FIG. 1.

The body of the transporter is a hollow container (103), preferably of 30–35 liter (8–10 gallon) capacity, and preferably made of plastic (but other materials can also be used). The body has two openings covered by caps, one (116), covered by cap (102) on the upper surface of the hollow container (103) and a smaller hole (105), covered by a cap (202) on the lower rear wall of the hollow container (103). The opening (116) on the top surface of the hollow container preferably has a diameter of approximately 10–12 cm (4–5 inches), and is placed immediately adjacent the sloping forward wall (115) of the container (103) for reasons to be explained below. The rear opening (105) preferably has a diameter of approximately 4–5 cm (2 inches). The caps preferably screw on, but could be attached by a bayonet arrangement or held in place by a bail or other holder. Optionally, a spigot may be included in either or both of the caps, as is commonly done in portable water coolers.

The forward portion of the hollow container (103) forms a forward support element (112), onto which the transporter may be tipped to allow the contents to be drained out of the upper opening (102). In an alternative embodiment, a compartment (110), perhaps closed by a hinged or removable hatch lid (101), is included in all or part of the forward support. The compartment can be used to store various items, such as a water purification or testing kit, food or grain, or chlorine tablets.

The hollow container (103) sits on a frame (111), that is preferably of tubular metal structure. The hollow container (103) is attached to the metal frame (111) via bolts (108) that protrude from the hollow container (103) and plastic or metal nuts (201) are then used to secure the hollow container (103) to the metal frame (111). Alternatively, the bolts (108) might be formed into the plastic of the container as it is blow-molded.

The hollow container (103) placement on the metal frame (111) is reinforced and stabilized by two horizontal support straps (107). Attached to the base of the metal frame (111) is a pair of legs (106), which are used for stability when the transporter (100) is stationary. The pair of legs (106) also serve the function of keeping the hollow container (103) off of the ground when the transporter (100) is in a stationary position.

A pair of large diameter wheels (109), preferably having solid rims or pneumatic rubber tires, support the transporter through an axle (114) attached to the forward end of the handles (104). The handles must be of sufficient strength to carry the weight of the full transporter (38 liters (10 gallons) of water weighs about 36 Kg (80 pounds)), and preferably also a safety margin of 60 Kg (130 pounds) or so, to allow for overloading, children riding along, etc. The opposite ends of the handles (104) preferably are formed into hand grips (113), as is usual in wheelbarrows or the like.

Figure 2:
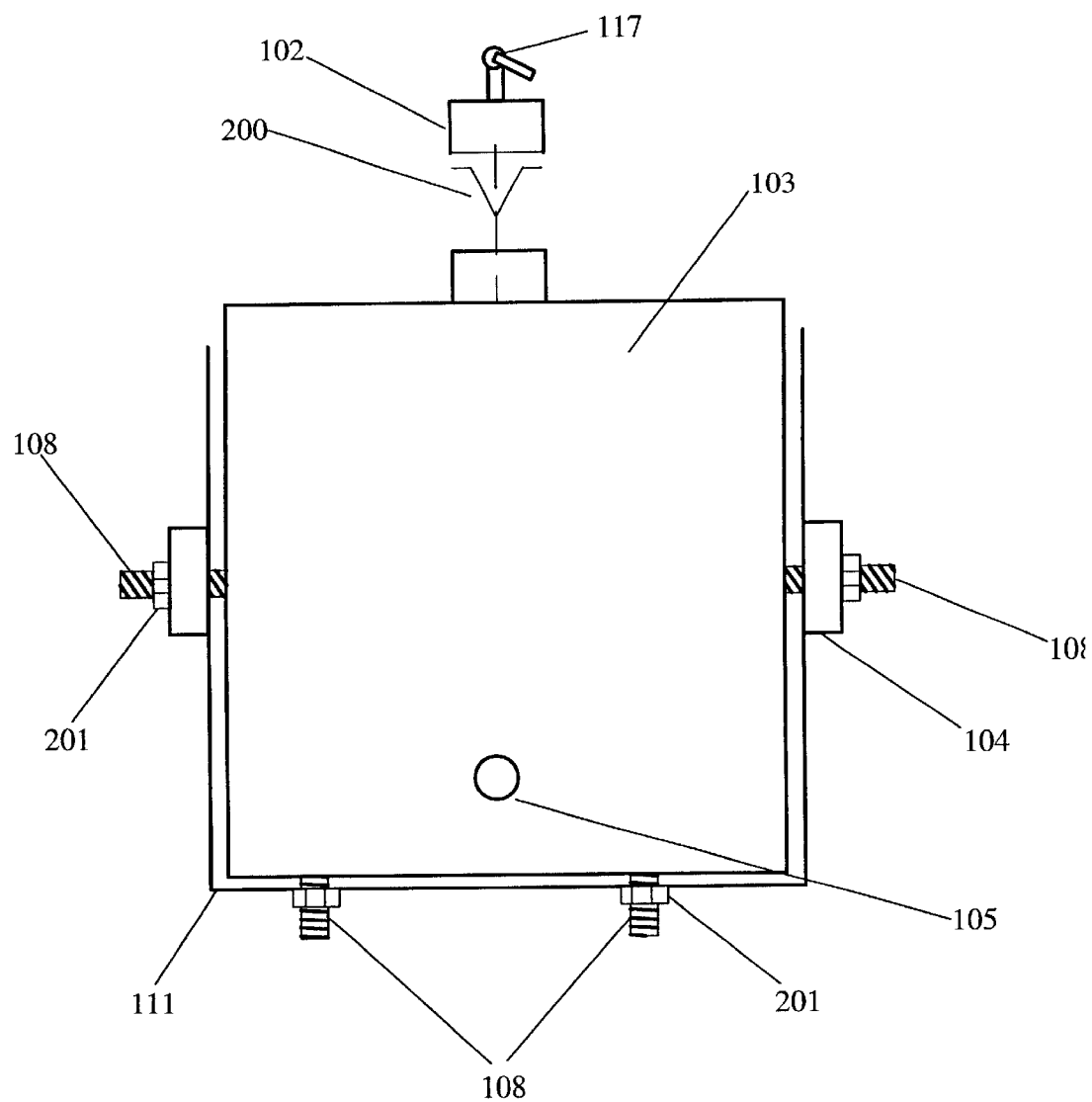
FIG. 2 shows a back view of the present invention.

Referring to FIG. 2, a back view of the present invention is shown. In this view, the upper screw caps (102) can be seen lifted off the upper opening. A mesh strainer (200), preferably of stainless steel or plastic or some other non-corrosive material, fits into the opening found on the top surface of the hollow container (103), so as to strain water or other fluid being put in the container and remove dirt, insects, plant debris or other contaminants. The mesh strainer (200) can be left in place when the screw cap (102) is placed over the opening found on the top surface of the hollow container (103), and is removable for the purpose of cleaning out any debris that may accumulate when the liquid is being drained out of the hollow container (103) or being poured into the hollow container (103).

Figure 3:
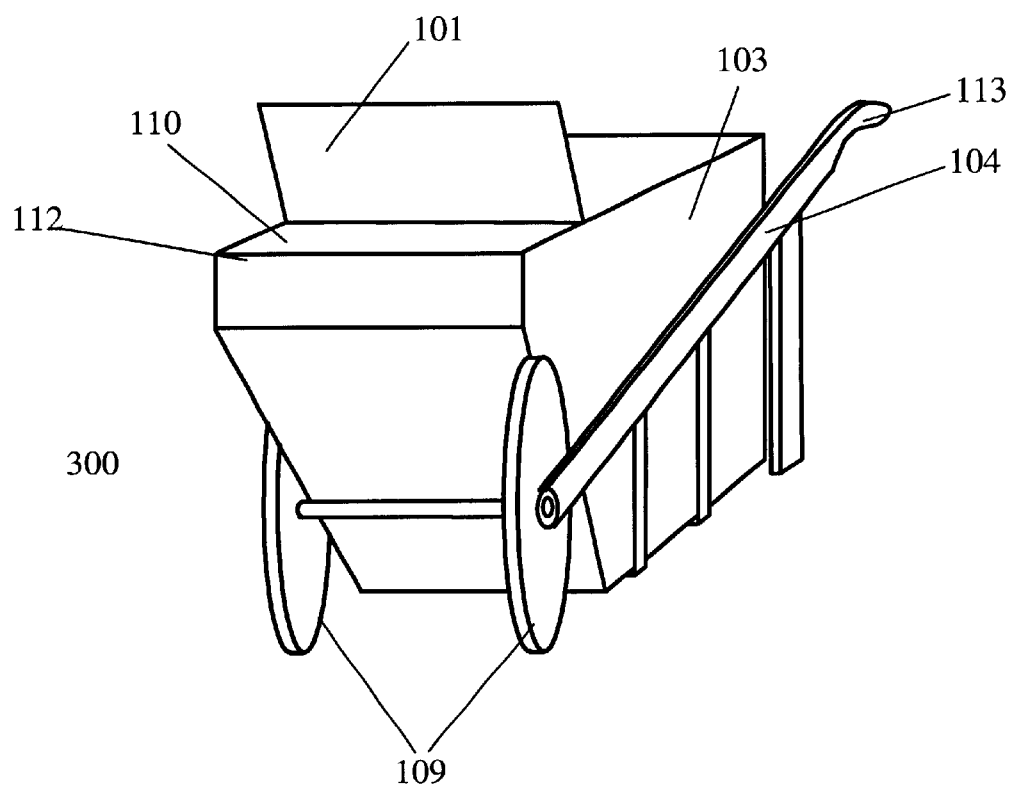
FIG. 3 shows a front-left side perspective view of the present invention.

FIG. 3 shows a front view of the multi-purpose transporter (100) clearly showing the pair of wheels (109) connected to each other by an axle (114).

In order to dump the contents placed in the hollow container (103), the transporter is tipped forward, so the legs (106) are above the wheels (109), and the weight of the container (103) rests on the forward support element (112). The transporter is easily tilted in this fashion by one person using the pair of handles (104) as a lever. In this orientation, the upper opening (116) is located at the very bottom of the container, next to the sloping forward side (115) of the container, allowing the contents of the container (103) to be emptied out completely. In the embodiment when a compartment (110) and hatch lid (101) are present, the depth of the compartment (110) raises the opening (116) above the ground, making it easier to put a pot or bucket or other container under the opening to catch the contents being dumped. If a spigot (117) is included in the cap (102), the transporter can be left in its stable, tipped-up position, and water or other fluid in the container can be easily dispensed in small quantities as needed.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A multi-purpose transporter comprising:
   a) a hollow container having an upper surface, a lower surface, a front surface, a rear surface, and right and left sides, the front surface meeting the upper surface and the lower surface at an angle such that the when the hollow container is tipped with the rear surface uppermost, at least one opening at a point in the upper surface adjacent the front surface is lowermost in the container, so that the container may drain completely through the opening;
   b) a pair of frame rails connected to the right and left sides of the hollow container, each having a first end extending rearwardly of the rear surface of the container and a second end connected to an axle adjacent to the front surface of the container;
   c) a frame extending between the pair of frame rails, underneath and supporting the hollow container;
   d) at least one leg attached to the frame;
   e) a pair of wheels on the axle, inward of the second ends of the pair of frame rails, the wheels being large enough to support the transporter over rough ground; and
   f) a front support structure connected to the front surface of the hollow container, such that when the transporter is tipped forward with the rear surface of the hollow container uppermost, the transporter is stably supported on the ground by the wheels and the front support structure, with the at least one opening on the upper surface of the container supported a distance above the ground permitting a container placed on the ground under the at least one opening to be filled by material flowing from the at least one opening.

2. The transporter of claim 1, wherein said frame is metal.

3. The transporter of claim 1, further comprising a handgrip on the first end of each of the frame rails.

4. The transporter of claim 1, in which the hollow container has a rear opening on the rear surface, adjacent the lower surface, and further comprising a cap sealably closing the rear opening.

5. The transporter of claim 1, further comprising a cap sealably closing the at least one opening on the upper surface of the container.

6. The transporter of claim 5, further comprising a mesh strainer in the at least one opening on the upper surface, underneath the cap, such that fluid poured into the opening is strained for debris.

7. The transporter of claim 5, in which the cap further comprises a spigot.

8. The transporter of claim 1, in which the front support structure comprises a compartment.

9. The transporter of claim 8, wherein said compartment has a lid.

10. The transporter of claim 1, wherein said hollow container has at least a 30 liter capacity.

* * * * *